June 4, 1940.　　　A. D. SIEDLE ET AL　　　2,203,509
CONTROL FOR REFRIGERATION SYSTEMS
Filed June 16, 1937　　　6 Sheets-Sheet 1

INVENTOR
Arnold D. Siedle
William H. Kitto
BY Harry S. Demarest
ATTORNEY INVENTOR
Arnold D. Siedle
William H. Kitto
BY Harry S. Demarse
ATTORNEY June 4, 1940.                A. D. SIEDLE ET AL                2,203,509
CONTROL FOR REFRIGERATION SYSTEMS
Filed June 16, 1937                          6 Sheets-Sheet 5

INVENTOR
Arnold D. Siedle
William H. Kitto
BY Harry S. Demarest
ATTORNEY

Patented June 4, 1940

2,203,509

UNITED STATES PATENT OFFICE 2,203,509

CONTROL FOR REFRIGERATION SYSTEMS

Arnold D. Siedle and William H. Kitto, Canton, Ohio, assignors to The Hoover Company, North Canton, Ohio, a corporation of Ohio Application June 16, 1937, Serial No. 148,442

26 Claims. (Cl. 62—5)

This invention relates to absorption refrigerating systems and more particularly to electrical control apparatus for such systems. Absorption refrigerating systems operated by heat and an electrical motor or the like for circulating inert gas therein are well known. It has been proposed to provide such a system with a heater for the boiler operated by gas or the like, and to provide an electrical motor for driving a fan or other device for circulating the inert gas between the evaporator and the absorber.

It is an object of the present invention to provide a novel control means for an absorption refrigerating system which will insure proper action of the system at all times.

It is a further object of the invention to provide a control for an absorption refrigerator which will insure proper defrosting control under various conditions.

It is a further object of the invention to provide a convenient arrangement of the control for the heater and circulator for an absorption refrigerating system.

It is an object of one form of the invention to provide a system wherein warm refrigerant liquid collects in the evaporator during the defrosting period to hasten the melting of the ice formed on the evaporator.

It is an object of another form of the invention to provide a defrosting control which is fully automatic after it has once been set in operation manually and which insures maximum economy during defrosting and utilizes the cooling effect of the frost formed on the evaporator to maintain the box temperature at a low point during defrosting.

It is an object of another form of the invention to provide a control for absorption refrigerating systems utilizing but one controlling dial.

It is a further object of the invention to provide a control which permits the housewife to shut off the machine while the evaporator is being cleaned, shelves removed, or the box cleaned without removing the electric plug and shutting off the gas valve.

It is a further object of the invention to provide a control for absorption refrigerating systems which allows warm refrigerant to collect in the evaporator during defrosting in order to hasten the defrosting process but which will automatically produce some refrigeration at the end of the defrosting period even though the housewife has neglected to set the control back to a normal controlling position.

Other objects and advantages reside in novel arrangement of parts and constructional features as will be apparent from the following description taken in connection with the accompanying drawings in which.

Figure 1:
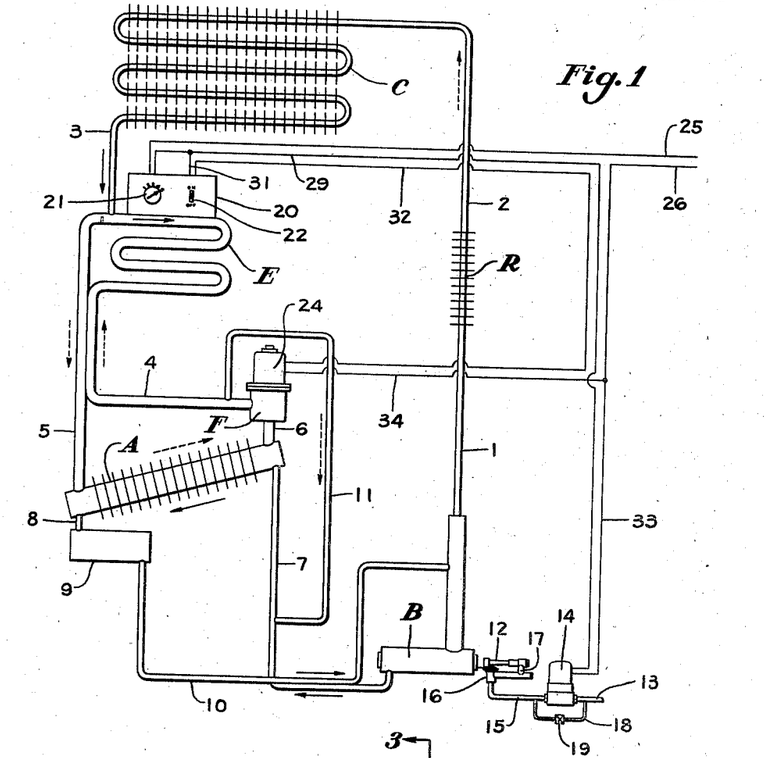
Figure 1 is a diagrammatic representation of a continuous absorption refrigerating system using inert gas and having a gas circulating fan driven by an electric motor. The diagram also illustrates the control apparatus for the system.

Referring to the drawings in detail and first to Figure 1 thereof, it will be apparent that an absorption refrigerating system is illustrated comprising a boiler B, a rectifier R, a condenser C, an evaporator E, an inert gas circulating fan F, and an absorber A. These elements are connected by various pipes to form an absorption refrigerating system. The pipe 1 conveys refrigerant vapor to the rectifier R where the water vapor entrained with the refrigerant is condensed and returned to the boiler B. From the rectifier R a conduit 2 conveys vaporized refrigerant to the condenser C where it is liquefied and discharges into the evaporator E through the pipe 3. Inert gas is conveyed from the fan F by means of conduit 4 into the evaporator E wherein the liquid refrigerant discharged from pipe 3 vaporizes into the inert gas and the mixture is discharged into the absorber A through pipe 5. In the absorber A the refrigerant vapor contained in the gas mixture discharged thereinto from pipe 5 is absorbed by absorption liquid and the inert gas returns to fan F through conduit 6. After the ammonia contained in the solution in boiler B has been vaporized, the remaining absorption liquid is conveyed to the absorber A by conduit 7. The strong solution discharged from the absorber through conduit 8 collects in a vessel 9 and is returned therefrom to the boiler B through conduit 10. In order that absorption liquid may be lifted from the level of the boiler to the top of the absorber, a portion of the inert gas discharged by the fan F is conveyed by conduit 11 to conduit 7 and functions to elevate the absorption liquid by gas lift action. Conduits 4 and 5 constituting parts of the inert gas circulatory system are positioned in heat exchange relation. Likewise the conduits 7 and 10 forming part of the absorption liquid circuit are also positioned in heat exchange relation.

A gas burner 12 is positioned to heat the boiler B. Gas is supplied to the burner 12 from supply conduit 13 through solenoid valve 14, conduit 15, safety cut-off valve 16 and conduit 17. The safety cut-off valve 16 is of a conventional type provided with a means for manually opening the same and having a thermostat positioned to be responsive to the flame of the burner 12 and adapted to maintain the valve open as long as a flame is carried on the burner 12. A small conduit 18 provided with a manual regulating valve 19 by-passes solenoid valve 14 in order to provide a minimum or pilot flame on the burner 12 at times when the refrigerator control has operated to cause the solenoid valve 14 to close.

Figure 2:
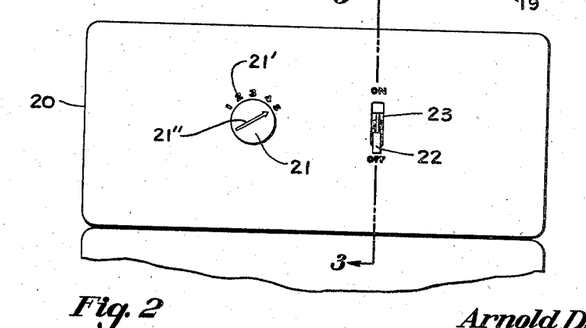
Figure 2 is a detail view showing the control panel and the arrangement of the control thereon in one form of the invention.
Figure 3:
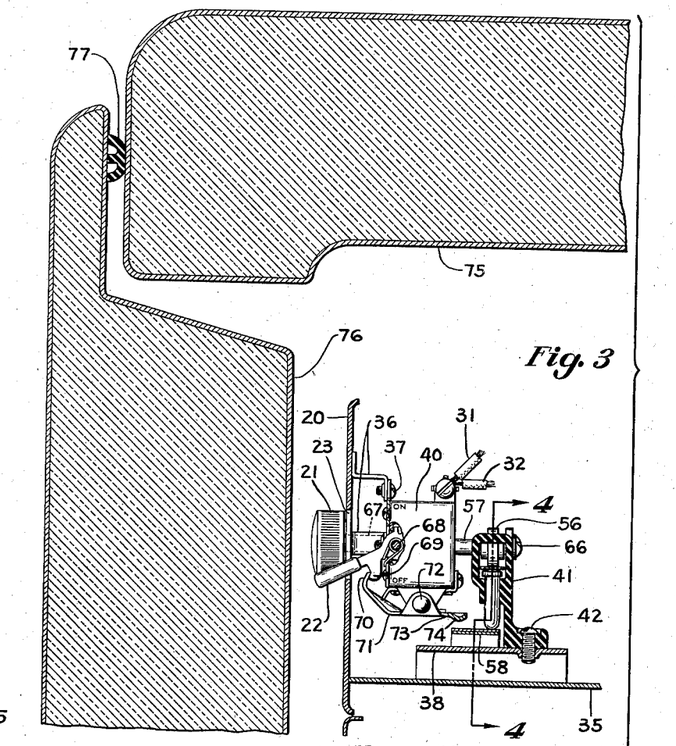
Figure 3 illustrates the arrangement of the control panel in the box in relation to the evaporator and walls of the refrigerating compartment, taken on line 3—3 of Figure 2.

A control panel 20 is mounted in any suitable manner at the front forward portion of the evaporator E, as shown in Figure 3, and carries a temperature regulating dial 21 and a defrosting switch actuator 22. As shown in Figures 2 and 3, the control dial 21 is mounted adjacent a series of markings 21' on the control panel 20 which cooperate with arrow 21'' to indicate to the operator the various controlling positions of the control dial. The defrosting switch actuator 22 operates through a slot 23 formed in panel 20.

Power is supplied to the solenoid valve 14 and inert gas circulating fan motor 24 by supply wires 25 and 26. Power supply wire 25 is connected to one terminal 27 of a controlling switch 30 hereinafter described. The other terminal 28 of switch 30 is connected to wire 29 which is connected to solenoid valve 14. A switch 40, controlled by actuator 22, is also connected to wire 29 by means of wire 31, see particularly Figures 3 and 4. The switch 40 is also connected to the inert gas circulating fan motor 24 by means of a wire 32. The supply line wire 26 is connected to the solenoid valve 14 and the circulating fan motor 24 by means of wires 33 and 34, respectively.

Figure 4:
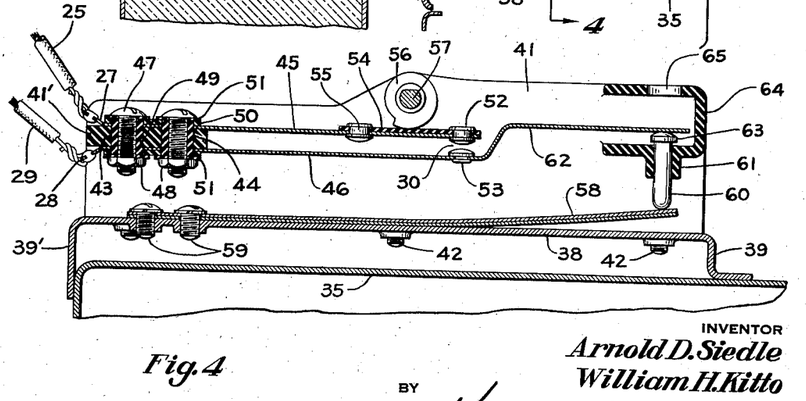
Figure 4 is a detail illustrating the control device utilized in Figures 1 to 3, taken on line 4—4 of Figure 3.

The manner in which the switching mechanisms 30 and 40 are mounted on the evaporator is illustrated in Figures 3 and 4. Referring to Figure 3, it will be seen that the control panel 20 rises above the top plate 35 of the evaporator and that the switching mechanisms 30 and 40 are positioned above the top plate of the evaporator and behind the control panel 20. The switch 40 is carried by brackets 36 which are rigidly attached to the panel 20 in any suitable manner and are attached to the switch 40 by screws 37.

The switching mechanism 30 is supported upon a bracket member 38 having down-turned ends 39 and 39' suitably attached to the top plate 35 of the evaporator in good thermal relationship as by brazing. The upstanding central portion of bracket 38 is above that portion of the evaporator which is normally covered with frost thereby minimizing frost deposition on the switching structure.

An upstanding supporting plate 41 made of insulating material is attached to bracket 38 by bolts 42. As shown in Figure 4 at the lefthand end thereof, plate 41 is provided with an outwardly projecting plate-like portion 41' provided with a pair of holes 43 and 44.

The switch 30 comprises two resilient contact carrying members 45 and 46 possessing good electrical-conducting characteristics. Members 45 and 46 are provided with holes aligned with the holes in the member 41' and are secured to member 41' by means of bolts and nuts 47 and 48, respectively. The securing bolts and nuts 47 and 48 are insulated from the contact carrying members 45 and 46 by means of insulating collars 49 passing through holes 43 and 44 and the aligned holes in the members 45 and 46. Insulating plates 50 are positioned on each of the members 45 and 46 and receive the insulating collars 49 therethrough. Suitable washers 51 are interposed between the nuts and heads of the bolts in the insulating plate 50.

Adjacent the central portion of member 41, the contact carrying members 45 and 46 are provided with contact members 52 and 53, respectively. An insulating plate 54 is secured to the top surface of contact carrying member 45 by means of contact member 52 and rivet 55. Insulating plate 54 is contacted by cold control cam 56 rigidly mounted on controlling shaft 57. Adjustment of the cam 56 varies the distance between contacts 52 and 53 and therefore the distance necessary for the thermostat, to be described hereinafter, to move contact 53 in order to close the controlling circuit.

A bimetallic thermostat 58 is secured to bracket member 38 by means of threaded bolts 59. The free end of thermostat 58 bears on the lower rounded end of an insulating plunger 60 slidably mounted in a collar-like extension 61 of base member 41. Contact carrying member 46 is provided with an extended portion 62 bearing on the enlarged head 63 of plunger 60, whereby vertical movement of the free end of thermostat 58 causes contacts 52 and 53 to close. The collar-like extension 61 forms a part of a U-shaped member 64 formed on base member 41. The upper leg of U-shaped member 64 is provided with an enlarged hole 65 through which pin 60 may be guided into collar member 61.

The inner or cam carrying portion of control shaft 57 is journalled in the supporting plate 41 by means of a stud 66 screwed into the end of shaft 57 and extending through member 41. The outer end 67 of shaft 57 is journalled in control panel 20 and carries control dial 21.

The defrosting switch 40 is a conventional type of snap-acting switch provided with a spiral spring 68 biasing the switch to the "on" position. Actuating arm 22 of switch 40 is provided with a downwardly extending hook-like member 69 adapted to be engaged with a complementary hook-like member 70 formed on the end of a pivoted latch 71 to lock switch 40 in the "off" position. Latching member 71 is pivotally attached to housing 40 by means of a pin 72 and is provided with a rearwardly extended arm 73 provided with a depressed portion 74 positioned above and adapted to be contacted by thermostat 58 when the evaporator has reached a defrosting temperature. A spring, not shown, normally urges the latching member 71 to latching position.

The relationship of the switching structure to the box structure is illustrated in Figure 3 wherein it will be seen that the switching structure is directly below the insulated top wall 75 of the refrigerating cabinet and directly to the rear of the insulated door 76 of the cabinet. A resilient sealing member 77 is interposed between the door 76 and top member 75 to prevent leakage of heat into the refrigerator.

The operation of this form of the invention is as follows: Thermostat 58 is responsive to the temperature condition in the evaporator and opens and closes contacts 52 and 53 to control inert gas fan circulating motor 24 and solenoid valve 14 in accordance with the demand for refrigeration. When the evaporator reaches the upper limit of temperature for which the cold controller dial 21 is set, the switch contacts 52 and 53 are closed whereby gas is supplied to the burner 12 and the inert gas is circulated by the fan F. When the temperature of the evaporator has been reduced to the value set on the controller, switch contacts 52 and 53 are opened.

When it is desired to defrost the apparatus, switch actuating handle 22 is moved manually to the "off" position in which position it is locked by latching member 71. This breaks the circuit to the motor 24 and thereby stops circulation in the inert gas system. Latch 71 holds switch 40 in the "off" position until the evaporator has reached a temperature, such as 40 degrees Fahrenheit, at which defrosting of the evaporator is assured whereupon thermostat 58 will contact the depressed part 74 of arm 73 and release the latching engagement between hook-like members 69 and 70 whereupon spring 68 will return switch 40 to the "on" position and normal operation of the apparatus will be resumed.

It will be apparent that the gas burner is operating during the defrosting period. As a result of this, refrigerant vapor driven out of the solution in the boiler is condensed in the condenser C and flows into the evaporator E, but as the inert gas is not circulating, this relatively warm refrigerant liquid collects in evaporator E and hastens the defrosting process. When defrosting is completed, the supply of refrigerant in evaporator E, collected during the defrosting period, begins to evaporate at a high rate and quickly lowers the temperature of the apparatus to the desired value for refrigerating.

The bracket 38 raises thermostat 58 above the top of the evaporator and thereby prevents thermostat 58 from becoming frost-bound.

The apparatus illustrated in Figures 5 to 8, inclusive, will now be described.

This form of the invention is designed to regulate the operation of the refrigerating apparatus illustrated in Figure 1 by directly controlling the solenoid gas valve 14 and the inert gas circulating fan motor 24.

Figure 5:
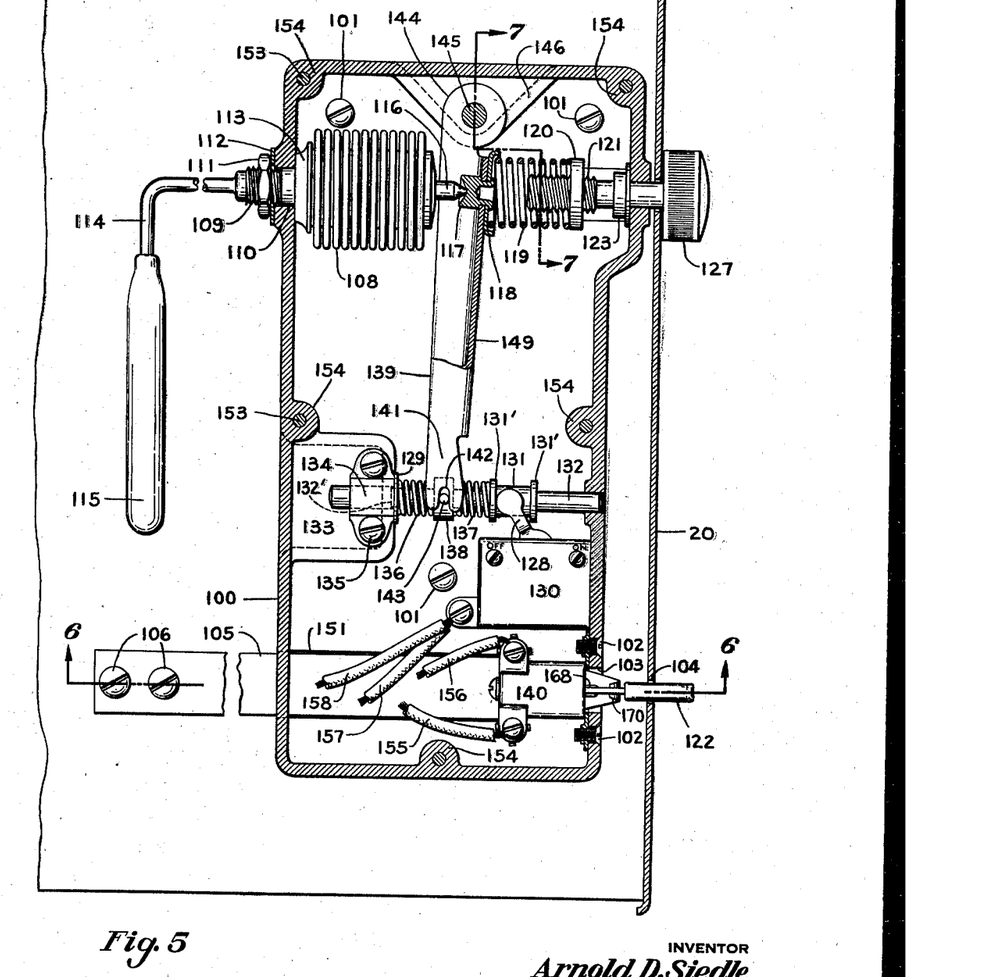
Figure 5 is a detail illustrating a further embodiment of applicants' invention as applied to a refrigerator.
Figure 6:
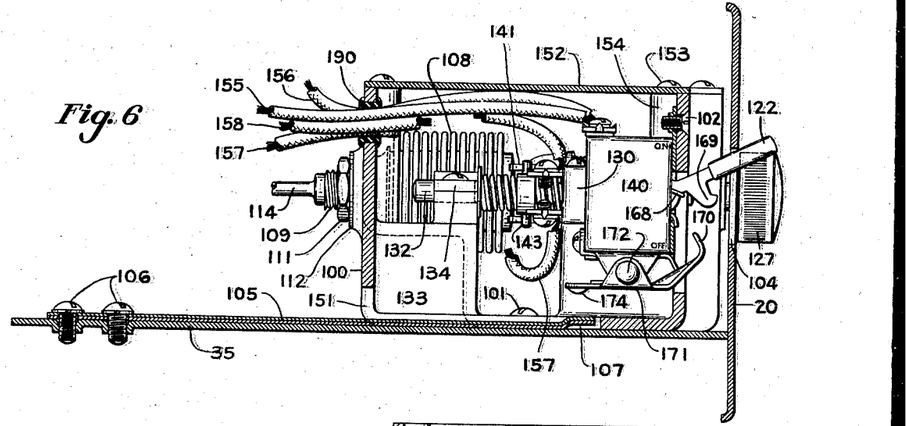
Figure 6 is a detail sectional view of the apparatus shown in Figure 5 and taken along the line 6—6 thereof.
Figure 7:
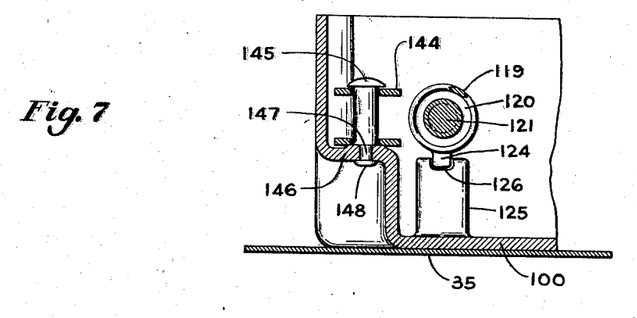
Figure 7 is a further detail view of the apparatus shown in Figure 5 and taken along the line 7—7 thereof.

In this form of the invention, a housing member 100 is suitably secured to the top of the evaporator 35 as by means of bolts 101.

Figure 8:
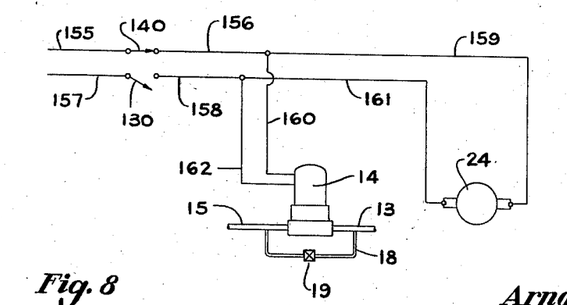
Figure 8 is a diagrammatic view of the control system of Figures 5 to 7.

Referring to Figure 8, it will be seen that in this form of the invention, as in that previuosly described, the refrigerator is controlled by controlling the operation of the solenoid gas supply valve 14 and the inert gas circulating fan motor 24. During normal operation, a snap switch 130 is opened and closed to control solenoid valve 14 and fan motor 24. Defrosting is accomplished by opening a snap switch 140 which interrupts the supply of electrical energy to the solenoid valve 14 and fan motor 24 independently of the normal controlling switch 130.

Defrosting switch 140 is rigidly secured to housing 100 by means of studs 102. Actuating arm 122 of switch 140 extends through a slot 103 in housing 100 and a slot 104 in control panel 20. Switch 140 is normally biased to the "on" position by spring 168 and is provided with lock-out mechanisms 169, 170, 171, 172, and 174 similar to the lock-out mechanisms 69, 70, 72, and 74 described in connection with Figure 3. A bimetallic thermostat 105 is directly secured to the top of the evaporator 35 by means of bolts 106 and is provided at its free end with an upwardly struck portion 107 positioned to engage portion 174 of latch member 171 to release switch 140 to spring 168 when the evaporator has reached a defrosting temperature. Thermostat 105 functions only to release switch 140 at the end of the defrosting period; therefore it is not necessary that this switch be elevated above the top of the evaporator for the reason that it is immaterial if it becomes frosted into the evaporator as it is not intended to operate until such time as all frost shall have been melted off the evaporator.

A Sylphon bellows 108 is provided with a rigid, hollow, outwardly extending threaded portion 109 extending through an opening 110 in the rear wall of housing 100. A nut 111 threaded on extension 109 draws an enlargement 113 on bellows 108 tightly against the rear wall of housing 100. A washer 112 is interposed between nut 111 and rear wall of housing 100. A conduit 114 connects bellows 108 with a sealed bulb 115 positioned adjacent any desired part of the evaporator whereby the fluid contained in bulb 115 will respond by pressure changes to changes in the temperature of the evaporator.

A hardened steel bearing pivot member 116 projects outwardly from the free end of bellows 108 and bears in the depressed portion of a bearing cup member 117 rigidly attached in any suitable manner to a spring retaining plate member 118 bearing against an adjusting spring 119. The outer end of spring 119 bears against an adjusting nut 120 carried by the adjusting screw 121. The screw 121 is journalled in the front wall of housing 100. The enlarged portion 123 of the adjusting screw 121 bears against a hardened steel thrust washer which positions the screw 121 laterally with respect to the housing 100. Adjusting nut 120 is provided with a downwardly extending guide tab 124 engaged in an elongated guide slot 126 formed in upstanding member 125 integral with housing 100. A control dial 127, similar to control dial 21, is carried on the outer end of shaft 121 at the outer face of control panel 20. Rotation of dial 127 advances or retracts the adjusting nut 120 and thereby varies the tension of spring 119 and hence the temperature necessary to cause movement of bellows 108 against the tension of spring 119. The adjusting nut 120 is prevented from rotating with shaft 121 by engagement of lug 124 in slot 126.

The snap switch 130 is secured to the housing 100 in any suitable manner and is provided with an actuating arm 128 engaged between the flanges 131' of a collar 131 which is rigid with a shaft 132. The shaft 132 is journalled in the front wall of the housing 100 and in a split bearing formed by an upstanding portion 113 of the housing 100 and a cap portion 134 held in place by the bolts 135. A collar 138 is slidably mounted on the shaft 132 and is interposed between two compression springs 136 and 137. The spring 137 abuts the fixed collar 131. The spring 136 abuts a washer 129 which bears against the enlarged portion 132' of the shaft 132 mounted in the split bearing or against the split bearing when the spring 136 is compressed.

Movement of bellows 108 is transmitted to switch 130 by means of a pivoted motion multiplying arm 139. The end of arm 139 remote from the bellows is bifurcated at 141 and each bifurcation is provided with a slot 142 engaging stud pins 143 projecting outwardly from each side of collar 138. The end of arm 139 adjacent the bellows is provided with rearwardly extending pivoting ears 144 which are pivotally mounted on a pin 145 rigidly attached to an indented, raised portion 146 of housing 100 by means of a reduced downwardly extending portion 147 which is riveted over at 148. The spring cup 118 is rigidly attached to the wall 149 of the arm 139 by a riveted over portion of the bearing cup member 117.

It will be noted that bimetal thermostat 105 is positioned partly within a slot 151 cut inwardly in the bottom wall of housing 100 from the end wall thereof.

The top of housing 100 is covered by a cover plate 152 which is secured to housing 100 by bolts 153 which are screwed into corner abutments 154 therein.

Referring to Figure 8 it will be seen that power is supplied to switches 140 and 130 by supply wires 155 and 157, respectively. Wire 156 leading from switch 140 is connected to motor 24 and solenoid valve 14 by wires 159 and 160, respectively. Wire 158 leading from defrosting switch 130 is connected to motor 24 and solenoid valve 14 by wires 161 and 162, respectively. Wires 155, 156, 157 and 158 pass out of housing 100 through an insulating member 190.

The bulb 115 being in thermal contact with the evaporator is responsive to changes in evaporator temperature. Thus, when the temperature of the evaporator rises, the fluid contained within bulb 115 expands increasing the pressure in bellows 108 which in turn expands against the resistance of spring 119 and swings arm 139 counter-clockwise, as viewed in Figure 5, thereby moving the shaft 132 and the collar 131 to snap the switch 130 to the "on" position, thus placing the refrigerating apparatus in operation. When the temperature of the evaporator has been lowered to the desired degree, the pressure in the bulb 115 decreases thereby allowing the bellows 108 to contract and permitting the spring 119 to swing the arm 139 in a clockwise direction. Clockwise movement of the arm 139 shifts the shaft 132 to the left and snaps the switch actuating arm 128 to the off position. The springs 136 and 137 are stronger than the spring in the switch 130 and function only as cushions to prevent damage if the arm 139 over-ride in either direction.

Regulation of the temperature is effected by movement of control dial 127 which by varying the tension of spring 119 determines the pressure necessary to be developed in bellows 108 in order that bellows 108 may operate arm 139 to actuate switch 130.

When it is desired to defrost the refrigerator, actuator 122 is moved manually to the "off" position where it is locked by latching mechanism 171. This opens circuit to both motor 24 and solenoid valve 14, thereby preventing operation of the refrigerating apparatus. When the evaporator temperature has reached a sufficiently high value to insure complete defrosting thereof, thermostat 105 will bend upwardly from the top plate of the evaporator and release latching mechanism 171 thereby allowing switch 140 to close under the influence of spring 168 and normal operation of the system is resumed.

With this system of defrosting, it will be seen that no aid is given the evaporator in melting the ice save only heat absorbed from materials within the refrigerating compartment. This system is characterized by a relatively lengthy defrosting period as compared with the system described in connection with Figures 1 to 4, but it utilizes the cooling effect of the melting frost to full advantage.

A third modification of the invention is illustrated in Figures 9 to 14, inclusive, and will now be described in detail.

This form of the invention is designed to regulate the operation of the refrigerating apparatus illustrated in Figure 1 by directly controlling the solenoid gas valve 14 and the inert gas circulating fan motor 24.

Figures 9, 9A, 10:
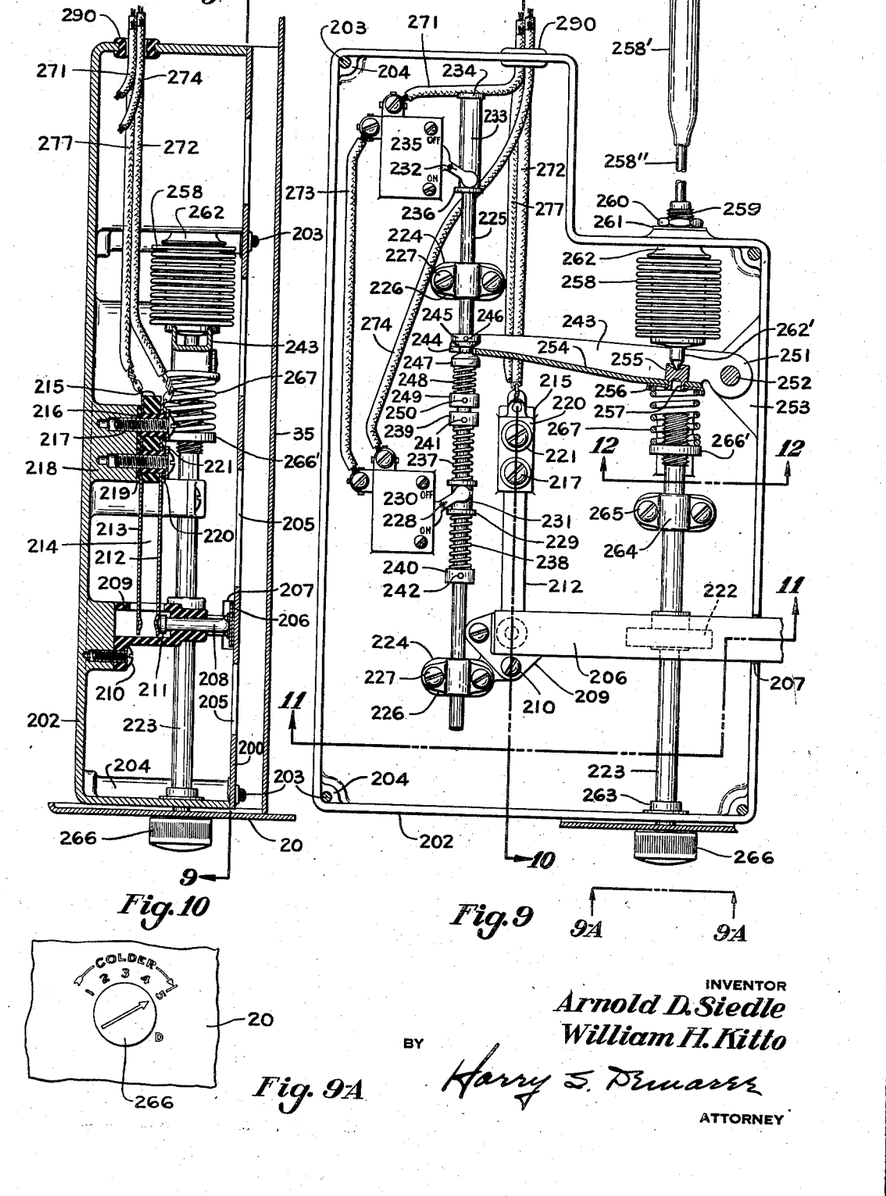
Figure 9 is a detail view illustrating a still further embodiment of the invention as applied to a refrigerator, taken along the line 9—9 of Figure 10.
Figure 9A is a fragmentary view taken on the line 9A—9A of Figure 9.
Figure 10 is a detail sectional view of the apparatus shown in Figure 9 taken along the line 10—10 thereof.
Figure 11:
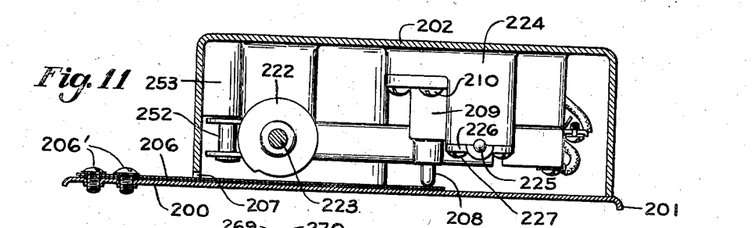
Figure 11 is a further detail sectional view of the apparatus shown in Figure 9 taken along the line 11—11 thereof.
Figure 12:
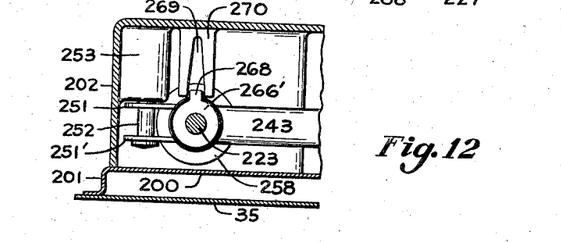
Figure 12 is a further detail view of the apparatus shown in Figure 9 taken along the line 12—12 thereof.

In this form of the invention, a bracket member 200, having downturned ends 201 rigidly secured to the top 35 of the evaporator casing, supports the controlling mechanism above the top plate of the evaporator and behind an upstanding forwardly positioned control panel 20. A housing member 202 is rigidly secured to bracket member 200 by means of bolts 203 extending through corner enlargement 204 in housing 202. Bracket member 200 is provided with numerous elongated slots 205 permitting air circulation through housing 202.

A bimetallic thermostat 206, extending through a bottom slot 207 in housing 202, is rigidly secured to bracket 200 by means of bolts 206'. The inner free end of bimetallic thermostat 206 bears on a depending insulating pin 208 slidably mounted in an insulating housing 209 rigidly attached to the top portion of housing 202 by means of threaded bolts 210. The upper headed portion 211 of pin 208 bears against a resilient switch-contact member 212 forming one of a pair of complementary switch-contact members 212 and 213 of a switch 214 which controls a solenoid gas valve 14 in a manner to be described hereinafter. Switch contact arms 212 and 213 are spaced apart by means of an insulating block 215 interposed therebetween at the fixed ends thereof. Insulating cylinders 216 extend through aligned openings in insulating block 215 and switch contact members 212 and 213. Threaded bolts 217 extend through collar 216 and are screwed into a depending enlargement 218 at the top plate of housing 202. An insulating plate 219 is interposed between enlargement 218 and switch contact member 213. A similar insulating plate 220 is interposed between contact member 212 and the heads of bolts 217. Washers 221 are interposed between insulating plate 220 and the heads of bolts 217.

The temperatures at which bimetallic thermostat 206 opens and closes switch 214 are determined by the setting of cold control cam 222 rigidly mounted on a controlling shaft 223 to be described more fully hereinafter.

The inert gas circulating fan 24 is controlled by a pair of snap switches 230 and 235 to be described more fully hereinafter which are rigidly mounted in any suitable manner on housing 202.

Housing 202 is provided interiorly thereof with a pair of depending supporting members 224 which slidably support a switch actuating shaft 225 by means of journal members 226 secured thereto by means of screws 227. Switch 230 is provided with an outwardly extending actuating arm 228 having the free end thereof engaged between the flanges 229 of a flanged collar 231 slidably mounted on shaft 225. Switch 235 has an actuating arm 232 extending outwardly and positioned to be actuated by flanges 234 and 236 of a collar 233 rigidly mounted on shaft 225. Switch actuating collar 231 is interposed between a pair of coil springs 237 and 238 which at their outer ends abut collars 239 and 240, respectively, rigidly attached to shaft 225 by means of pins 241 and 242. The springs 237 and 238, like the springs 136 and 137, being stronger than the spring in the switch 230, permit the shaft 225 to actuate the switch 230 without lost motion and act as damage preventing cushions if the control mechanism overrides in either direction. Shaft 225 is actuated by means of a pivotally mounted channel-shaped arm 243 having a slot 244 formed in the free end thereof and engaging around shaft 225. The outer end of arm 243 is engaged between a collar 245 rigidly secured to shaft 225 by means of a pin 246 on the side of arm 243 adjacent switch 235, and a collar 247 slidably mounted on shaft 225. A spring 248 is interposed between slidably mounted collar 247 and a collar 249 rigidly attached to shaft 225 by means of a pin 250 in order to eliminate lost motion between the arm 243 and the shaft 225.

At its pivoted end, arm 243 is provided with a pair of spaced, outwardly extending pivoting lugs 251 and 251' pivotally mounted on a headed pin 252 rigidly attached to a depending lug 253 of housing 202. The bight portion 254 of channel-shaped arm 243 is engaged along with a spring-retaining plate 256 in a reduced portion 257 of a bearing member 255.

A Sylphon bellows 258 is rigidly attached to the rear end wall of housing 202 by means of a hollow outwardly projecting threaded portion 259 on which is threaded a nut 260 which functions to clamp enlarged portion 262 of bellows 258 against the said end wall. A washer 261 is interposed between the said end wall and nut 260. The free end of bellows 258 is provided with a pointed hard steel bearing member 262' bearing in a depression in bearing member 255.

The bellows 258 is connected with a bulb 258' filled with a volatile liquid or an expansible gas by means of a conduit 258" connected to the end of member 259. The bulb 258' is positioned in contact with any desired part of the evaporator to be responsive to the temperature changes therein whereby the bellows expands and contracts in response to such changes.

Control shaft 223 is journalled in the front wall of housing 202 and in a journal member 264 rigidly attached to housing 202 by means of bolts 265. The outer end of shaft 223 extends through control panel 20 and carries a control dial 266. An enlarged portion 263 of the shaft 223 bears against a hardened steel thrust washer and positions the shaft longitudinally with respect to the housing 202. The inner end of shaft 223 is screw threaded and has threaded thereon a spring tension adjusting nut 266' against which bears spring 267. Spring 267 also bears against spring retaining plate 256. Rotation of spring adjusting nut 266' is prevented by engagement of an upstanding guide lug 268 in a guide slot 269 formed in a depending guiding member 270.

Figure 14:
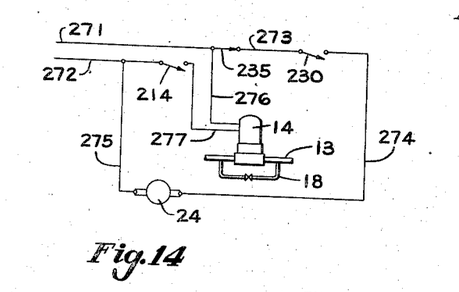
Figure 14 is a schematic diagram of the control system illustrated in Figures 9 to 13.

Referring now to Figure 14 it will be seen that power is supplied to the apparatus by supply wires 271 and 272. It will be seen that supply wire 271 is connected directly to switch 235 which is in series with switch 230 being connected thereto by supply wire 273. Switch 230 is connected to the inert gas circulating fan motor 24 by means of a supply wire 274 and the circuit is completed from motor 24 to wire 272 by wire 275. Wire 271 is also directly connected to solenoid valve 14 by means of wire 276. Solenoid valve 14 is connected to wire 272 through wire 277 and switch 214.

Wires 271, 272, 274 and 277 are led from the switches in housing 202 through the rear wall thereof by means of an insulating member 290.

The operation of the device in Figures 9 to 14, inclusive, will now be described:

During normal operation of the refrigerating machine bellows 258 expands and contracts in response to temperature changes at the evaporator thereby moving arm 243 to actuate switch 230 to start and stop the inert gas circulating fan motor 24, the switch 235 being normally in the closed position. The bimetallic thermostat 206 is synchronized with the bellows 258 in order to control the supply of gas to the burner through the solenoid valve 14 in response to temperature changes at the evaporator. The temperature maintained in the evaporator is determined by the setting of control dial 266 which controls shaft 223. When shaft 223 is turned, cam 222 bears on bimetallic thermostat 206 to thereby regulate the temperature at which switch 214 is closed. Simultaneously with movement of cam 222 adjusting nut 266' is advanced or retracted thereby increasing or decreasing the tension of spring 267 which regulates the resistance to bellows 258 and the temperature at which arm 243 operates the switch 230. When the evaporator temperature rises to the control point, bellows 258 overcomes spring 267 and swings arm 243 in a counter-clockwise direction as viewed in Figure 9. This movement of arm 243, through the take-up spring 248 and the collar 249, moves shaft 225 toward the front wall of housing 202. Movement of the shaft 225 toward the front wall of the housing 202 moves the collar 231 toward the front wall of housing 202 until switch actuating arm 228 has passed over center whereupon switch 230 snaps to the "on" position. When the evaporator temperature has lowered to the desired value, bellows 258 contracts, spring 267 swings arm 243 in a clockwise direction, and arm 243 bearing against collar 245 shifts shaft 225 rearwardly of housing 202. Rearward movement of the shaft 225 moves the collar 231 rearwardly until the switch 230 snaps to the "off" position.

When it is desired to defrost the machine, control dial 266 is turned to the defrosting position and is immediately returned to any desired setting. Movement of the dial 266 to defrosting position advances adjusting nut 266' and compresses spring 267 to such an extent that arm 243 is rotated clockwise, as viewed in Figure 9, against the resistance of bellows 258 until flange 236 of collar 233 has snapped actuating arm 232 of switch 235 to the "off" position. During this movement shaft 225 tends to carry the arm 228 beyond the normal "off" position of switch 230; in order to prevent damage to arm 228, spring 238 is compressed between the flange 229 and the collar 240 but is released immediately the control dial is returned to any normal controlling position. The return of control dial 266 to a normal controlling point does not return switch 235 to the "on" position. This is due to the relatively large distance between flanges 234 and 236. It will be apparent that immediately the dial is returned to a normal control point, the gas valve 14 will be opened to supply gas to the burner if the evaporator temperature is above that for which the controls are set, and that during at least a portion of the defrosting period warm liquid refrigerant will be supplied to the evaporator in the manner described in connection with the controls illustrated in Figures 1 to 4. As the evaporator temperature increases the pressure in bellows 258 also increases until it overcomes the resistance of spring 267 and swings arm 243 in a counter-clockwise direction. However, after arm 243 has actuated switch 230 to the "on" position the machine does not resume operation due to the fact that switch 235 is still in the "off" position. Continued rise in the evaporator temperature causes continued movement of arm 243 in a counter-clockwise direction until the evaporator has reached a defrosting temperature, such as 40 degrees Fahrenheit, whereupon arm 243 has moved shaft 225 toward the front wall of housing 202 to bring flange 234 and actuating arm 232 into contact, whereupon switch 235 is snapped to the "on" position and the machine resumes normal operation.

In the event that the housewife should forget to return the control dial to a normal controlling position after moving dial 266 into the defrosting position, the bellows will develop sufficient pressure when the evaporotor temperature has reached about 45 degrees to actuate switches 230 and 235 to the "on" position and to thereby resume circulation of the inert gas to evaporate the small amount of refrigerant liquid which collects in the evaporator during the defrosting period due to the continued operation of the pilot flame carried by burner 12. This has the additional advantage that the box temperature is prevented from exceeding a safe temperature even though the control valve is left in the defrosting position. The small amount of refrigerant vapor driven off by the pilot flame will be sufficient to maintain this temperature in the refrigerating compartment under normal conditions.

It will be seen that this form of the invention is well adapted to operate on a defrosting cycle wherein both the inert gas circulating fan motor and the solenoid gas supply valve are shut off during defrosting, or to defrost rapidly when the gas supply valve is open and the inert gas circulating fan motor is inoperative.

A further advantage of this form of the invention lies in the fact that it provides a means for stopping the operation of the machine without disconnecting the electrical plug or shutting off the suply of gas when the housewife desires to clean the evaporator, ice trays, shelf or interior of the refrigerating compartment.

Figure 13:
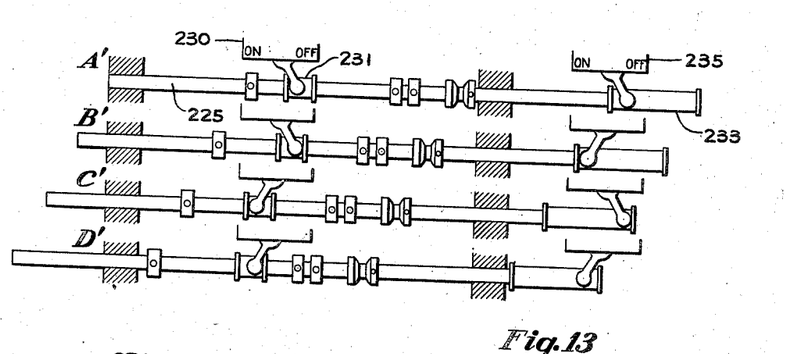
Figure 13 is a diagrammatic view representing the various operating positions of the controlling switches and throwing mechanism therefor.

Figure 13 shows the various positions of the switches 230 and 235. In the position A', the control valve has just been turned to the defrosting position and both switches are off. The position B' illustrates one of the normal operating positions with the defrosting switch on and the normal control switch 230 off. Position C' shows the position of the switches after the dial 266 has been turned to the defrosting position and returned. Here the defrosting switch is in the "off" position and the normal controlling switch 230 is in the "on" position. Position D' illustrates the position of the switches at the end of the defrosting cycle when the switch 235 has just been turned to the "on" position.

It will be obvious that various changes may be made in the construction and arrangement of parts and in the operation thereof. For example, the invention may be practiced with the normal controls connected to start and stop either the gas burner 12 or the fan F while allowing the other to operate continuously. With such a system defrosting would be accomplished by discontinuing operation of the gas burner only, the fan only, or both. If the gas burner operates continuously it will carry a moderate flame and refrigeration will be produced only during periods of operation of the circulating fan as evaporation can only occur when the inert gas is circulated in the presence of liquid refrigerant. If the fan operates continuously refrigeration will be produced only during periods of operation of the gas burner. Defrosting will be accomplished with or without a continuing supply of refrigerant to the evaporator depending upon the control adopted for the gas burner.

While we have illustrated and described several embodiments of our invention, it is to be understood that these are to be taken as illustrative only and not in a limiting sense. It is within the purview of our invention to modify the form thereof without departing from the spirit of the invention or the scope of the appended claims.

We claim:

1. The method of controlling the operation of an absorption refrigerator of the type involving an evaporator, a source of heat to expel refrigerant vapor from solution, and a power-driven inert gas circulating means, which comprises the steps of simultaneously controlling the supply of heat and the supply of power to the gas circulating means in response to temperature changes in the evaporator and defrosting the evaporator by discontinuing the supply of power to the inert gas circulating means.

2. The method of controlling the operation of an absorption refrigerator of the type involving an evaporator, a source of heat to expel refrigerant vapor from solution, and power driven means for circulating one of the fluids in the system, which comprises the steps of simultaneously controlling the source of heat and the power driven circulating means in response to temperauture conditions of the evaparator, and defrosting the evaporator by discontinuing the circulation of said one fluid.

3. The method of controlling the operation of an absorption refrigerator of the type involving an evaporator, a source of heat to expel refrigerant vapor from solution, and power driven means for circulating one of the fluids in the system, which comprises the steps of simultaneously controlling the source of heat and the power driven circulating means in response to temperature conditions of the evaporator, and defrosting the evaporator by discontinuing the supply of heat until the temperature of the evaporator has risen above the melting temperature of ice.

4. The method of controlling the operation of an absorption refrigerator of the type involving an evaporator, a source of heat to expel refrigerant vapor from solution, and power driven means for circulating one of the fluids in the system, which comprises the steps of simultaneously controlling the source of heat and the power driven circulating means in response to temperature conditions of the evaporator, and defrosting the evaporator by discontinuing the supply of heat and the circulation of said one fluid until the evaporator temperature exceeds the melting temperature of ice.

5. The method of controlling a refrigerator of the absorption type utilizing an inert gas to balance pressure differences in the refrigerator, a gas burner to expel refrigerant vapor from solution, and a means for circulating the inert gas, which comprises the steps of reducing the burner flame to a pilot flame, discontinuing the circulation of inert gas until the evaporator has defrosted automatically, resuming circulation of the inert gas at the end of the defrosting period to evaporate refrigerant collected in the evaporator during defrosting and refrigerant expelled from solution by the pilot flame after defrosting.

6. Refrigerating apparatus comprising a boiler, a condenser, an evaporator, and an absorber connected to form an absorption refrigerating system, means to heat the boiler, means to circulate an inert gas in the system, means responsive to the demand for refrigeration operative to start and stop operation of said heating and circulating means simultaneously, and manually set means operative to discontinue operation of said circulating means to cause defrosting of the evaporator and automatically operative to cause said circulating means to resume operation when the evaporator has defrosted.

7. Refrigerating apparatus comprising a boiler, a condenser, an evaporator, and an absorber connected to form an absorption refrigerating system, a gas burner positioned to heat the boiler, a motor-driven fan for circulating an inert gas in the system, a solenoid valve controlling the supply of gas to said burner, a source of electric current, switching means controlling the supply of current to said solenoid valve and said motor, temperature responsive means positioned to be responsive to evaporator temperature, means operative to transmit movements of said temperature responsive means to said switching means whereby said motor and valve simultaneously operate to supply gas to said burner and current to said motor in response to evaporator temperature, a manually opened switch operative to discontinue the supply of current to said motor to defrost the evaporator, and means operative to close said normally opened switch when the evaporator has reached a defrosting temperature.

8. Refrigerating apparatus comprising a boiler, a condenser, an evaporator, and an absorber connected to form an absorption refrigerating apparatus, a gas burner positioned to heat the boiler, a motor-driven fan connected to circulate an inert gas between the absorber and evaporator, a source of electric current, a solenoid valve controlling the supply of gas to said burner, switching means positioned on top of the evaporator controlling the supply of current to said solenoid valve and fan motor, and means responsive to evaporator temperature operative to supply current simultaneously to said solenoid valve and fan motor when the evaporator temperature exceeds a predetermined high value and to discontinue said supply of current when the evaporator temperature reaches a predetermined low value.

9. Refrigerating apparatus comprising a boiler, a condenser, an evaporator, and an absorber connected to form an absorption refrigerating apparatus, a gas burner positioned to heat the boiler, a motor-driven fan connected to circulate an inert gas between the absorber and evaporator, a source of electric current, a solenoid valve controlling the supply of gas to said burner, switching means positioned on top of the evaporator controlling the supply of current to said solenoid valve and fan motor, and means responsive to evaporator temperature operative to supply current simultaneously to said solenoid valve and fan motor when the evaporator temperature exceeds a predetermined high value and to discontinue said supply of current when the evaporator temperature reaches a predetermined low value, and means for discontinuing the supply of current to said fan motor independently of the controlling position of said means responsive to evaporator temperature to defrost the evaporator.

10. Refrigerating apparatus comprising a boiler, a condenser, an evaporator and an absorber connected to form an absorption refrigerating system, a source of heat for the boiler, means for circulating an inert gas in the system, a thermostat rigidly attached to the top of said evaporator at one end, means controlling the operation of said heat source and inert gas circulating means positioned to be actuated by the free end of said thermostat, manually set means operative to discontinue operation of said inert gas circulating means, latch means operative to hold said manually set means in position to discontinue operation of said gas circulating means and positioned to be moved to unlatching position by said thermostat when the evaporator reaches a defrosting temperature.

11. In absorption refrigerators of the type having an evaporator, a burner to expel refrigerant vapor from solution, and a fan to circulate an inert gas, control means comprising a housing mounted on the evaporator, a Sylphon bellows mounted in the housing, a bulb containing an elastic fluid positioned to be responsive to changes in evaporator temperature and communicating with said bellows, means controlling the operation of said burner and fan, means connecting said bellows and said controlling means, means resisting controlling movement of said bellows in one direction, and means for varying the resistance of said resisting means to vary the temperature at which said controlling means is actuated.

12. In combination with absorption refrigerating apparatus having a boiler, an evaporator, means to circulate an inert gas through the evaporator, and means to heat the boiler, control means comprising a pair of serially connected snap switches controlling operation of said circulating means, a switch controlling said heating means, a thermostat positioned to be responsive to the demand for refrigeration actuating said last mentioned switch, means responsive to the demand for refrigeration connected to open and close one of said serially connected switches during normal operation, means resisting controlling movement of said last mentioned means, means for adjusting the resistance of said resisting means and operative to overcome said last mentioned refrigeration demand responsive means to open the other of said serially connected switches to defrost the evaporator.

13. Apparatus for controlling refrigerators having an evaporator, a source of heat, and a gas circulating fan, comprising means controlling the operation of said source of heat in response to refrigerating condition, means controlling the operation of said circulating fan in response to refrigerating conditions, means for simultaneously varying the action of said controlling means, means normally inoperative for discontinuing operation of said gas circulating fan, and means for rendering said normally inoperative means operative.

14. Apparatus for controlling the operation of an absorption refrigeration system of the type having an evaporator, a source of heat, and means for circulating an inert gas in the system, comprising means controlling the operation of said heat source and circulating means in response to the evaporator temperature, means for adjusting the controlling temperature of said controlling means having a plurality of controlling positions and a defrosting position, means operative to discontinue operation of said circulating means, means connecting said controlling means and said last mentioned means including a lost motion connection whereby said second mentioned gas circulation controlling means is unaffected by said temperature responsive means and said adjusting means in the controlling positions thereof and is actuated to discontinue operation of said circulating means when the adjusting means is in the defrosting position, said lost motion connection being so arranged that said temperature responsive means operates to cause said second mentioned gas circulation controlling means to resume operation when the evaporator has defrosted.

15. In combination with absorption refrigerating apparatus having a boiler, an evaporator, power driven means to circulate an inert gas through the evaporator, and means to heat the boiler, a control comprising means responsive to refrigeration demand for simultaneously starting and stopping operation of said heating means and said power driven circulating means, and means operative to discontinue operation of said heating means to defrost the evaporator.

16. Refrigerating control mechanism comprising temperature responsive means, energy supply control means connected to be operated by said temperature responsive means, a second energy supply control means normally in energy supply control position connected in series with said first mentioned energy supply control means, means for regulating the controlling temperature of said temperature responsive means, means operated by movement of said regulating means for operating said second mentioned energy supply control means to energy interrupting position, and means operated by said temperature responsive means in response to an abnormal temperature for restoring said second mentioned energy supply control means to energy supplying condition.

17. Refrigerating apparatus of the type utilizing a source of heat and a power driven circulator comprising means for governing the operation of said heat source and circulator, means adapted to respond to refrigeration demand for operating said governing means, normally inoperative means for rendering inoperative one of the elements under the control of said governing means, means for regulating the operation of said refrigeration demand responsive means, means operated by said regulating means for rendering said normally inoperative means operative and means operated by said refrigeration demand responsive means for returning said normally inoperative means to inoperative condition.

18. Control mechanism comprising a temperature responsive element, an energy supply regulating means operatively connected to said control element, means for determining the temperature conditions at which said energy regulating means is operated, a second energy supply regulating means, a lost motion connection between said temperature responsive means and said second mentioned regulating means, the arrangement being such that said second mentioned regulating means is moved to a first position by movement of said temperature limit determining means and is returned to its original regulating position by said temperature responsive means, said lost motion connection having sufficient range to permit operation of said first mentioned energy regulating means by said temperature responsive means in all normal positions of said temperature limit determining means without affecting said second mentioned energy supply regulating means.

19. Apparatus for controlling the operation of a refrigerating system of the type having an evaporator, a heating element, and a power driven circulating element comprising refrigeration demand responsive means for controlling the operation of said heating and circulating elements, manually set defrosting means for rendering one of said elements inoperative, and means operated by said demand responsive means for restoring said defrosting means to unset condition in response to the condition of the evaporator when defrosted.

20. Apparatus for controlling the operation of a refrigerating system of the type having a heating element and a power driven fluid circulating element comprising a thermostat adapted to respond to refrigeration demand, means operated by said thermostat for controlling the operation of said heating and circulating means, means for adjusting said thermostat to alter the temperatures at which it operates said controlling means, manually settable defrosting means for rendering said heating and circulating means inoperative independently of said adjusting means, and means operated by said thermostat when responding to a defrosting temperature for restoring said defrosting means to non-defrosting condition.

21. Apparatus for controlling the operation of a refrigerating system of the type having a heating element and a power driven fluid circulating element comprising a thermostat adapted to respond to refrigeration demand, means operated by said thermostat for controlling the operation of said heating and circulating means, means for adjusting said thermostat to alter the temperatures at which it operates said controlling means, manually settable defrosting means for rendering said heating and circulating means inoperative independently of said adjusting means, and latch means for holding said defrosting means in defrosting position, said latch means being positioned to be operated by said thermostat when responding to a defrosting temperature to release said defrosting means.

22. Apparatus for controlling the operation of a refrigerating system of the type having an evaporator, a heating element, and a power driven circulating element comprising refrigeration demand responsive means for controlling the operation of said heating and circulating elements, manually set defrosting means for rendering one of said elements inoperative, and temperature responsive means for restoring said defrosting means to unset condition when the evaporator has defrosted.

23. Apparatus for controlling the operation of a refrigerating system of the type having a heating element and a power driven fluid circulating element comprising a thermostat adapted to respond to refrigeration demand, means operated by said thermostat for controlling the operation of said heating and circulating means, means for adjusting said thermostat to alter the temperatures at which it operates said controlling means, manually settable defrosting means for rendering said heating and circulating means inoperative independently of said adjusting means, latch means for holding said defrosting means in defrosting position, and a thermostat for releasing said latch means in response to a defrosting temperature.

24. Apparatus for controlling the operation of a refrigerating system of the type having a heating element and a power dirven circulating element comprising refrigeration demand responsive means for controlling one of said elements, a second refrigeration demand responsive means for controlling the other of said elements, and means for simultaneously adjusting each of said refrigeration demand responsive means to alter the controlling conditions thereof.

25. Apparatus for controlling the operation of a refrigerating system of the type having a heating element and a power driven circulating element comprising refrigeration demand responsive means for controlling one of said elements, a second refrigeration demand responsive means for controlling the other of said elements, and means for simultaneously adjusting each of said refrigeration demand responsive means to alter the controlling conditions thereof, means operated by movement of said adjusting means to a defrosting position for rendering one of said elements inoperative, and means operated by the refrigeration demand responsive means associated with said inoperative elements for operating said defrosting means to non-defrosting position.

26. Apparatus for controlling the operation of a refrigerating system of the type having a heating element and a power driven circulating element comprising refrigeration demand responsive means for said heating element, a second refrigeration demand responsive means for controlling said circulating means, an adjusting means having a plurality of normal controlling positons and a defrosting position for simultaneously adjusting each of said refrigeration demand responsive means to alter the controlling conditions thereof, defrosting means operated by movement of said adjusting means to defrosting position for rendering said heating element inoperative, and means operated by said first mentioned demand responsive means when responding to a refrigerating demand induced by a defrosted condition of the refrigerating apparatus for operating said defrosting means to restore said heating means to operative condition.

ARNOLD D. SIEDLE.
WILLIAM H. KITTO.